(12) United States Patent
Liu et al.

(10) Patent No.: US 12,401,282 B2
(45) Date of Patent: Aug. 26, 2025

(54) SWITCHING CONVERTER HAVING LINEAR CONVERSION FUNCTION AND CONVERSION CONTROL CIRCUIT AND METHOD THEREOF

(71) Applicant: Richtek Technology Corporation, Zhubei (TW)

(72) Inventors: San-Hsien Liu, Taichung (TW); Che-Wei Wu, Hsinchu (TW); Po-Chin Fan, Hsinchu (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 209 days.

(21) Appl. No.: 18/486,978

(22) Filed: Oct. 13, 2023

(65) Prior Publication Data
US 2024/0297587 A1    Sep. 5, 2024

(30) Foreign Application Priority Data
Mar. 3, 2023    (TW) ................................. 112107741

(51) Int. Cl.
*H02M 3/158*    (2006.01)
*H02M 1/00*    (2006.01)
(Continued)

(52) U.S. Cl.
CPC ....... *H02M 3/1584* (2013.01); *H02M 1/0025* (2021.05); *H02M 1/32* (2013.01); *H02M 3/003* (2021.05)

(58) Field of Classification Search
CPC ..... G05F 1/00; G05F 1/10; G05F 1/12; G05F 1/46; G05F 1/455; G05F 1/45;
(Continued)

(56) References Cited

U.S. PATENT DOCUMENTS 7,786,712 B2    8/2010    Williams
8,072,199 B2 *  12/2011   Nagase ................. H02M 3/158
                                                    323/282
(Continued)

FOREIGN PATENT DOCUMENTS

TW            202114336 A        4/2021

*Primary Examiner* — Jeffrey A Gblende
(74) *Attorney, Agent, or Firm* — Tung & Associates

(57) ABSTRACT

A switching converter for converting an input voltage to an output voltage includes: a power stage circuit which includes a high-side switch, a low-side switch and an auxiliary transistor; and a conversion control circuit for controlling the high-side switch, the low-side switch and the auxiliary transistor. In a switching conversion mode, the conversion control circuit controls the auxiliary transistor to be ON, and controls the high-side switch and the low-side switch to switch an inductor to convert the input voltage to the output voltage. In a pre-charging mode, the conversion control circuit controls the low-side switch to be OFF, and controls the auxiliary transistor to pre-charge the output voltage. In a linear conversion mode, the conversion control circuit controls the low-side switch to be OFF, and controls the auxiliary transistor to linearly convert the input voltage to the output voltage according to a feedback signal related to the output voltage.

30 Claims, 11 Drawing Sheets

(51) Int. Cl.
*H02M 1/32* (2007.01)
*H02M 3/00* (2006.01)

(58) Field of Classification Search
CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069
See application file for complete search history.

(56) References Cited

U.S. PATENT DOCUMENTS

| | | | |
|---|---|---|---|
| 10,644,598 B1* | 5/2020 | Lewinski Komincz | H02M 1/08 |
| 10,686,407 B2* | 6/2020 | Nomiyama | H03F 3/21 |
| 12,046,999 B2* | 7/2024 | Park | G09G 3/3266 |
| 2024/0235368 A1* | 7/2024 | Lee | H02J 7/06 |

\* cited by examiner

| Mode / State | Pre-charging Mode | Switching Conversion Mode | Linear Conversion Mode |
|---|---|---|---|
| QH State | On/Off | Switching | On |
| QL State | Off | Switching | Off |
| QA State | Pre-charging is successively turned On | On | Linear Conversion |

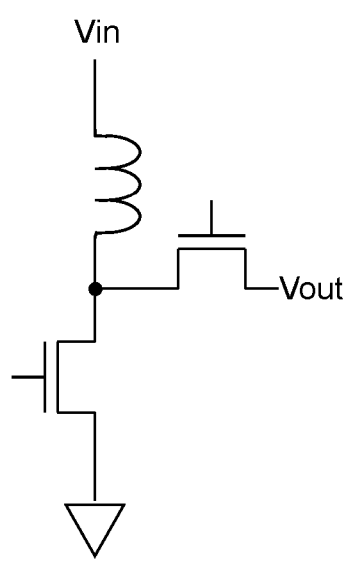
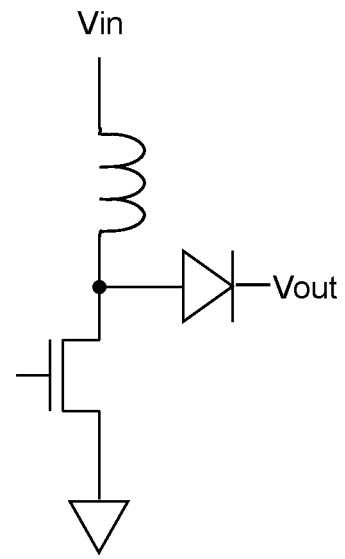
Fig. 12A
Fig. 12B
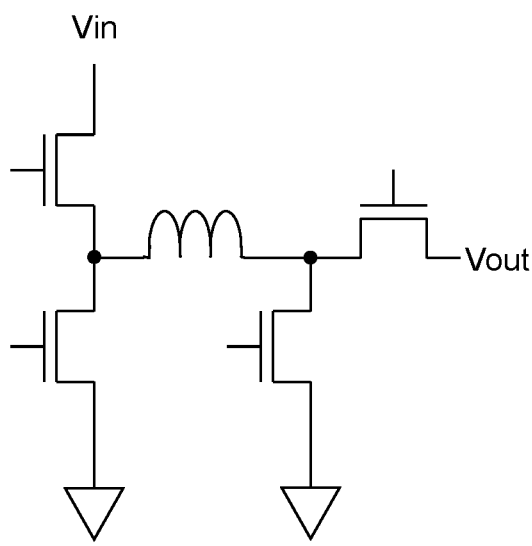
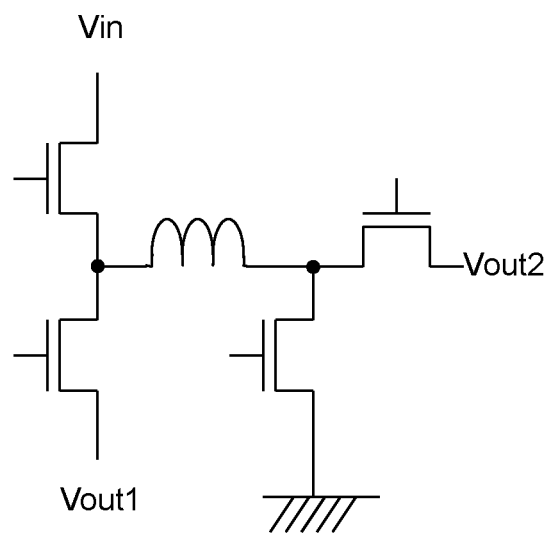
Fig. 12C
Fig. 12D

SWITCHING CONVERTER HAVING LINEAR CONVERSION FUNCTION AND CONVERSION CONTROL CIRCUIT AND METHOD THEREOF

CROSS REFERENCE

The present invention claims priority to TW 112107741 filed on Mar. 3, 2023.

BACKGROUND OF THE INVENTION

Field of Invention

The present invention relates to a switching converter; particularly, it relates to such switching converter capable of performing linear conversion, so that such switching converter is applicable in a wider input voltage. The present invention also relates to a conversion control circuit and a conversion control method which are configured to control such switching converter.

Description of Related Art

Please refer to FIG. 1A, which shows a schematic diagram of a conventional switching converter. As shown in FIG. 1A, the conventional switching converter 900 includes: a power stage circuit 90, a pre-charging circuit 91 and a control circuit 95. A switch Q1 and a switch Q2 switch an inductor L1 according to outputs of the control circuit 95, so as to convert an input voltage Vin to an output voltage Vout. The conventional power stage circuit 90 is a boost converter.

Please refer to FIG. 1A along with FIG. 1B. FIG. 1B illustrates a signal waveform diagram depicting an output voltage of a conventional switching converter of FIG. 1A. As shown in FIG. 1B, when the conventional switching converter 900 begins to operate at a time point t1, the conventional switching converter 900 enters a pre-charging mode. In the pre-charging mode, the switch Q1 is OFF. Besides, in the pre-charging mode, the pre-charging circuit 91 controls a transistor Q3 to generate a pre-charging current I1 according to a bias current source Ib, so that a level of the output voltage Vout is ramped up with a slope. Note that when the level of the output voltage Vout is extremely low, the pre-charging current I1 is controlled by the transistor Q3, thus avoiding excessively huge surge current, so as to prevent power supply devices and components from being damaged. When the level of the output voltage Vout is ramped up to a level equal to a level of the input voltage Vin, the conventional switching converter 900 enters a switching mode. In the switching mode, the transistor Q3 is controlled to be ON, and the switch Q1 and the switch Q2 are controlled to switch the inductor L1, so that the level of the output voltage Vout is ramped up to a target voltage level V1.

Generally speaking, in a conventional boost converter, the target voltage level V1 is higher than the level of the input voltage Vin. Nevertheless, the prior art shown in FIG. 1A and FIG. 1B has the following drawbacks that: when a difference between the target voltage level V1 and the level of the input voltage Vin is excessively small, or when the level of the input voltage Vin is higher than the target voltage level V1, as shown during a period ranging from a time point t2 to a time point t3 in FIG. 1B, the conventional switching converter 900 enters a bypass mode. In the bypass mode, the level of the output voltage Vout is equal to the level of the input voltage Vin, and cannot be regulated to the target voltage level V1 (due to the conventional power stage circuit 90 is a boost converter). When the level of the input voltage Vin is excessively higher than the target voltage level V1, the level of the output voltage Vout will be greatly deviated from the target voltage level V1.

In view of the above, to overcome the drawbacks in the prior art, the present invention proposes a switching converter capable of entering a linear conversion mode when a difference between the target voltage level and the level of the input voltage is smaller than a predetermined level. In the linear conversion mode, when the level of the input voltage is higher than the target voltage level, the level of the output voltage can still be regulated to the target voltage level, which is not limited by the nature of a boost converter. Note that, in the present invention, a power transistor for pre-charging in a pre-charging conversion mode is also for linear conversion in a linear conversion mode, thus saving cost and reducing size.

SUMMARY OF THE INVENTION

From one perspective, the present invention provides a switching converter capable of performing linear conversion, wherein the switching converter is configured to operably convert an input voltage to an output voltage; the switching converter comprising: a power stage circuit which includes: a high-side switch, a low-side switch and an auxiliary transistor, wherein one end of the high-side switch, one end of the low-side switch and one end of an inductor are coupled to a switching node, wherein another end of the high-side switch and one end of the auxiliary transistor are coupled to an intermediate node, wherein another end of the auxiliary transistor is coupled to the output voltage; and a conversion control circuit, which is configured to operably control the high-side switch, the low-side switch and the auxiliary transistor; wherein in a switching conversion mode, the conversion control circuit is configured to operably control the auxiliary transistor to be ON and control the high-side switch and the low-side switch to switch the inductor, so as to convert the input voltage to the output voltage; wherein in a pre-charging conversion mode, the conversion control circuit is configured to operably control the low-side switch to be OFF and control the auxiliary transistor to pre-charge the output voltage; wherein in a linear conversion mode, the conversion control circuit is configured to operably control the low-side switch to be OFF and control the auxiliary transistor to linearly convert the input voltage to the output voltage according to a first feedback signal related to the output voltage.

In one embodiment, in the pre-charging conversion mode, the conversion control circuit is configured to operably control the high-side switch to be OFF; and/or wherein in the linear conversion mode, the conversion control circuit is configured to operably control the high-side switch to be ON.

In one embodiment, in the switching conversion mode, the conversion control circuit is configured to operably control switching of the high-side switch and the low-side switch, so as to regulate the output voltage to a target voltage level, wherein when a difference between the target voltage level and the input voltage is smaller than a first predetermined level, the switching converter enters the linear conversion mode.

In one embodiment, in the linear conversion mode, the conversion control circuit is configured to operably control the auxiliary transistor, so as to regulate the output voltage to the target voltage level, wherein when the difference between the target voltage level and the input voltage is greater than a second predetermined level, the switching converter enters the switching conversion mode.

In one embodiment, in the pre-charging conversion mode, when the output voltage is being pre-charged close to the input voltage, the switching converter enters the switching conversion mode.

In one embodiment, an anode and a cathode of a body diode of the high-side switch are coupled to the switching node and the intermediate node respectively, and an anode and a cathode of a body diode of the auxiliary switch are coupled to the output voltage and the intermediate node, respectively.

In one embodiment, the conversion control circuit includes: a first feedback circuit, which is configured to operably generate the first feedback signal according to the output voltage; and an error amplifier, which is configured to operably amplify a difference between the first feedback signal and a first reference signal to generate an error amplification signal; wherein in the linear conversion mode, the auxiliary transistor is configured to operably convert the input voltage to the output voltage linearly according to the error amplification signal.

In one embodiment, the conversion control circuit further includes: a current mirror circuit, wherein the current mirror circuit includes the auxiliary transistor; wherein in the pre-charging conversion mode, the current mirror circuit is configured to operably mirror a bias current source, so as to control the auxiliary transistor to generate a pre-charging current for pre-charging the output voltage; wherein the pre-charging current is positively proportional to the bias current source.

In one embodiment, the conversion control circuit further includes: a transconductance transistor; wherein in the linear conversion mode, the transconductance transistor is configured to operably generate a linear control current according to the error amplification signal, wherein the current mirror circuit is further configured to operably mirror the linear control current, so as to control the auxiliary transistor to linearly convert the input voltage to the output voltage.

In one embodiment, the conversion control circuit further includes: a transconductance transistor and a current mirror circuit, wherein the current mirror circuit includes the auxiliary transistor; wherein in the linear conversion mode, the transconductance transistor is configured to operably generate a linear control current according to the error amplification signal, wherein the current mirror circuit is configured to operably mirror the linear control current, so as to control the auxiliary transistor to linearly convert the input voltage to the output voltage.

In one embodiment, when the output voltage is higher than an overly-high voltage threshold and lower than an overly-low voltage threshold and/or when an output current related to the output voltage is higher than an overly-high current threshold, the conversion control circuit is configured to operably control the auxiliary transistor to be OFF.

From another perspective, the present invention provides a conversion control circuit, which is configured to operably control a switching converter, wherein the switching converter is configured to operably convert an input voltage to an output voltage, wherein the switching converter includes: a high-side switch, a low-side switch and an auxiliary transistor, wherein one end of the high-side switch, one end of the low-side switch and one end of an inductor are coupled to a switching node, wherein another end of the high-side switch and one end of the auxiliary transistor are coupled to an intermediate node, wherein another end of the auxiliary transistor is coupled to the output voltage; the conversion control circuit comprising: a switching control circuit, which is configured to operably control the high-side switch and the low-side switch to switch the inductor, so as to convert the input voltage to the output voltage in a switching conversion mode, wherein in the switching conversion mode, the auxiliary transistor is ON; a pre-charging control circuit, which is configured to operably control the auxiliary transistor to pre-charge the output voltage in a pre-charging conversion mode, wherein in the pre-charging conversion mode, the low-side switch is OFF; a linear control circuit, which is configured to operably control the auxiliary transistor to linearly convert the input voltage to the output voltage according to a first feedback signal related to the output voltage in a linear conversion mode, wherein in the linear conversion mode, the low-side switch is OFF.

From yet another perspective, the present invention provides a conversion control method, which is configured to operably control a switching converter, wherein the switching converter includes: a high-side switch, a low-side switch and an auxiliary transistor; the conversion control method comprising the following steps: in a switching conversion mode, controlling the auxiliary transistor to be ON and controlling the high-side switch and the low-side switch to switch the inductor, so as to convert the input voltage to the output voltage; in a pre-charging conversion mode, controlling the low-side switch to be OFF and controlling the auxiliary transistor to pre-charge the output voltage; in a linear conversion mode, controlling the low-side switch to be OFF and controlling the auxiliary transistor to linearly convert the input voltage to the output voltage according to a first feedback signal related to the output voltage.

The objectives, technical details, features, and effects of the present invention will be better understood with regard to the detailed description of the embodiments below, with reference to the attached drawings.

BRIEF DESCRIPTION OF THE DRAWINGS

FIG. 12A to FIG. 12D show schematic diagrams of a power stage circuit in a switching converter according to several embodiments of the present invention.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1A:
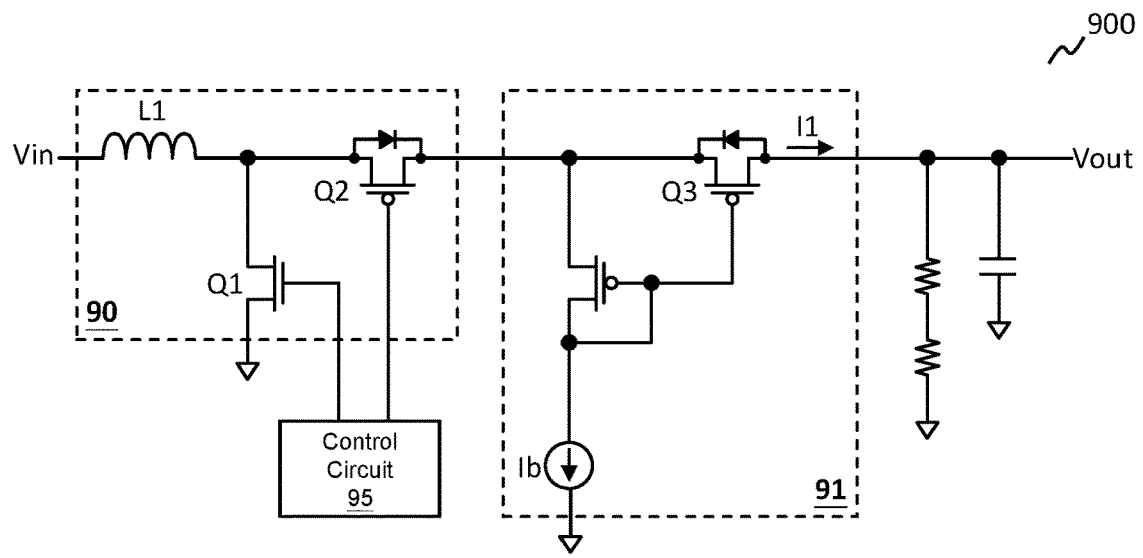
FIG. 1A shows a schematic diagram of a conventional switching converter.
Figure 1B:
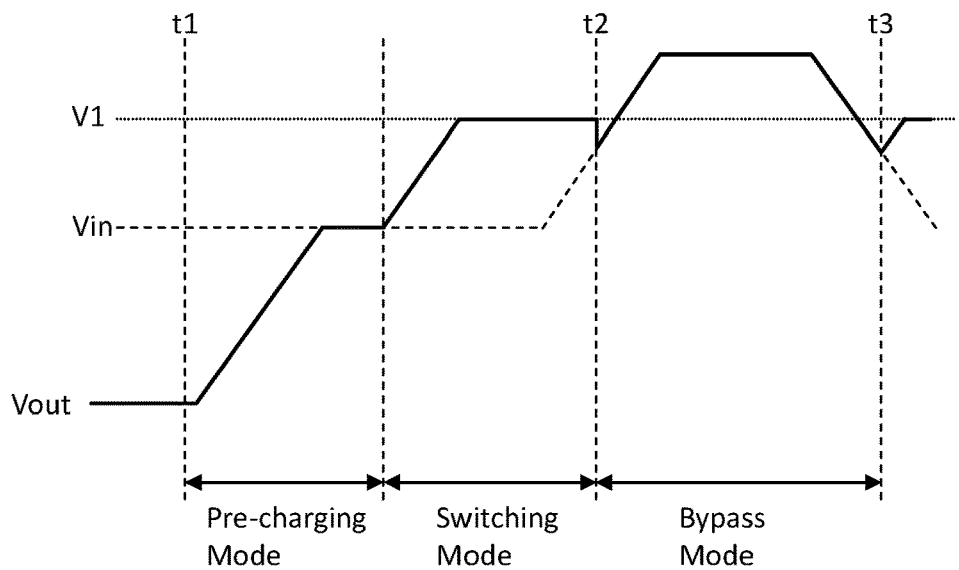
FIG. 1B illustrates a signal waveform diagram depicting an output voltage of a conventional switching converter of FIG. 1A.
Figure 2:
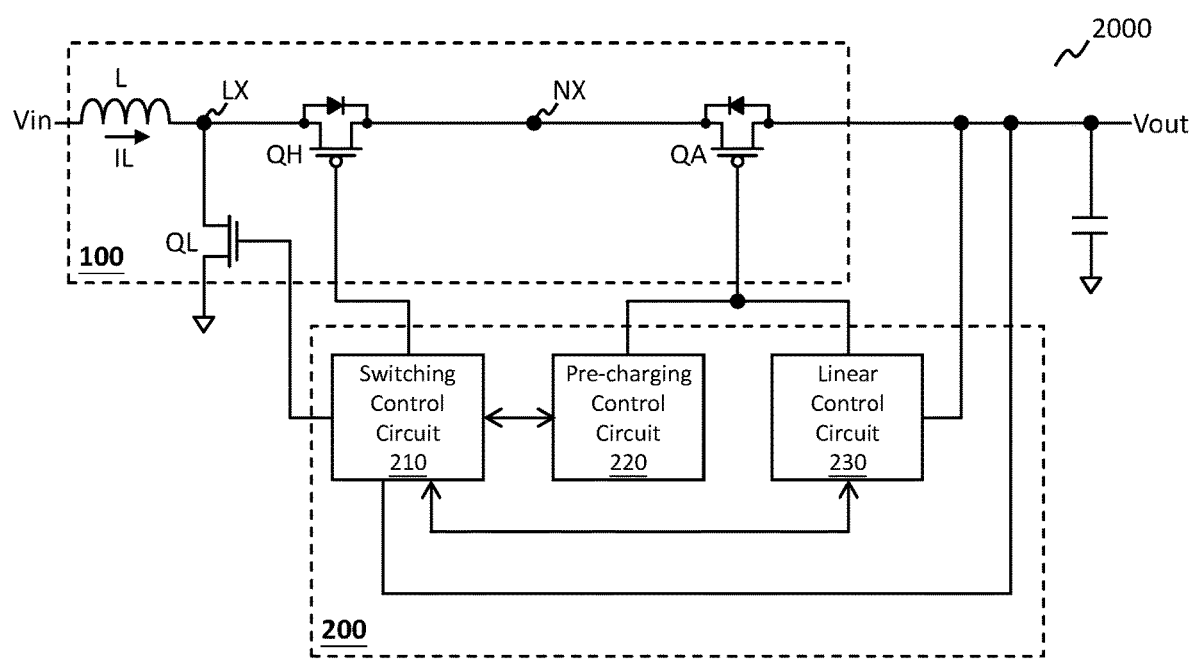
FIG. 2 shows a block diagram of a switching converter according to an embodiment of the present invention.

Please refer to FIG. 2, which shows a block diagram of a switching converter according to an embodiment of the present invention. In one embodiment, the switching converter 2000 of the present invention is configured to operably convert an input voltage Vin to an output voltage Vout. The switching converter 2000 of the present invention comprises: a power stage circuit 100 and a conversion control circuit 200. In one embodiment, the power stage circuit 100 is implemented as a boost converter, which includes: a high-side switch QH, a low-side switch QL, an auxiliary transistor QA and an inductor L. In one embodiment, the conversion control circuit 200 is configured to operably control the high-side switch QH, the low-side switch QL and the auxiliary transistor QA. In one embodiment, the conversion control circuit 200 includes: a switching control circuit 210, a pre-charging control circuit 220 and a linear control circuit 230.

In one embodiment, as shown in FIG. 2, the high-side switch QH can be for example a P-type metal oxide semiconductor (MOS) device, the low-side switch QL can be for example an N-type MOS device, and the auxiliary transistor QA can be for example a P-type MOS device. In one embodiment, one end of the high-side switch QH, one end of the low-side switch QL and one end of the inductor L are coupled to a switching node LX. Another end of the low-side switch QL is coupled to a ground potential. Another end of the high-side switch QH and one end of the auxiliary transistor QA are coupled to an intermediate node NX. Another end of the auxiliary transistor QA is coupled to the output voltage Vout.

In one embodiment, a body diode of the high-side switch QH is reverse-coupled to a body diode of the auxiliary transistor QA, so that when a switch path from the switching node LX to the output voltage Vout is OFF, a current possibly due to a forward bias voltage can be prevented. To elaborate in more detail, in this embodiment, an anode and a cathode of a body diode of the high-side switch QH are coupled to the switching node LX and the intermediate node NX respectively, and an anode and a cathode of a body diode of the auxiliary switch QA are coupled to the output voltage Vout and the intermediate node NX, respectively.

In one embodiment, the switching control circuit 210 is configured to operably control the high-side switch QH and the low-side switch QL according to a signal related to the output voltage Vout and information provided by the pre-charging control circuit 220 and the linear control circuit 230. The pre-charging control circuit 220 is configured to operably control the auxiliary transistor QA according to information provided by the switching control circuit 210.

The linear control circuit 230 is configured to operably control the auxiliary transistor QA according to the signal related to the output voltage Vout and the information provided by the switching control circuit 210.

Figure 3:
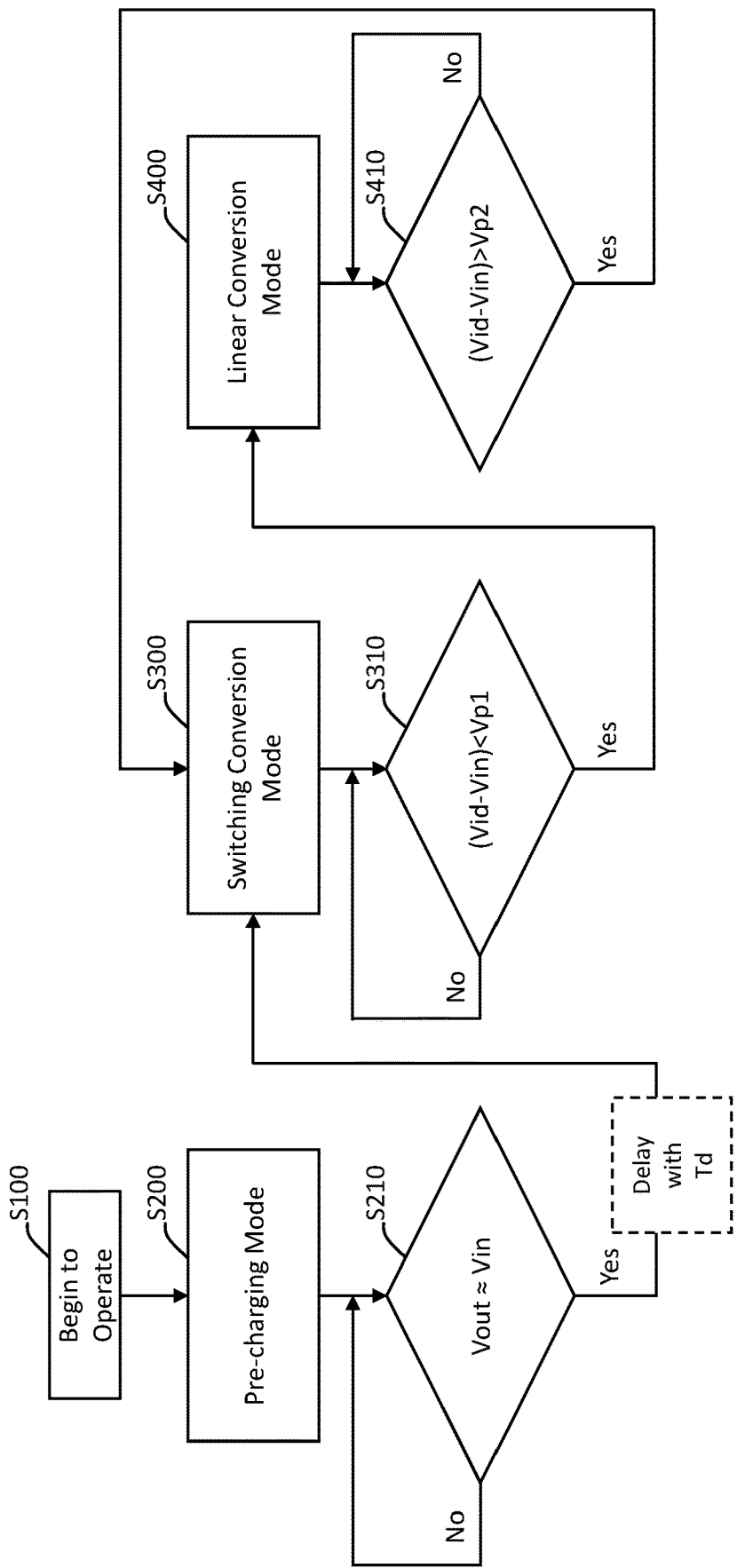
FIG. 3 is a flow chart diagram depicting operation procedures for a switching converter according to an embodiment of the present invention.

Please refer to FIG. 2 along with FIG. 3. FIG. 3 is a flow chart diagram depicting operation procedures for a switching converter according to an embodiment of the present invention. In one embodiment, as shown in FIG. 3, firstly, the switching converter 2000 begins to operate in a step S100. Subsequently, the switching converter 2000 enters a step S200 which is a pre-charging conversion mode. In the pre-charging conversion mode (i.e., step S200), the pre-charging control circuit 220 is configured to operably control the auxiliary transistor QA to pre-charge the output voltage Vout. Subsequent to the step S200, the switching converter 2000 enters a determination step S210 which includes: determining whether a level of the output voltage Vout is close to a level of the input voltage Vin. If it is determined that a result of the step S210 is yes, the switching converter 2000 enters a step S300 which is a switching conversion mode or otherwise the switching converter 2000 returns to the step S210. In one embodiment, when it is determined that the result of the step S210 is yes, after a delay period TD, the switching converter 2000 will subsequently proceed to the step S300 (i.e., switching conversion mode). In the step S300 (i.e., switching conversion mode), the switching control circuit 210 is configured to operably control the high-side switch QH and the low-side switch QL to switch the inductor L, so as to regulate the output voltage Vout substantially to a target voltage level Vid.

In one embodiment, subsequent to the step S300, the switching converter 2000 enters a determination step S310 which includes: determining whether a difference between the target voltage level Vid and the level of the input voltage Vin is smaller than a first predetermined level Vp1. If it is determined that a result of the step S310 is yes, the switching converter 2000 enters a step S400 which is a linear conversion mode or otherwise the switching converter 2000 returns to the step S310. In the linear conversion mode (i.e., step S400), the linear control circuit 230 is configured to operably control the auxiliary transistor QA to linearly convert the input voltage Vin to the output voltage Vout according to a signal related to the output voltage Vout. Subsequent to the step S400, the switching converter 2000 enters a determination step S410 which includes: determining whether the difference between the target voltage level Vid and the level of the input voltage Vin is greater than a second predetermined level Vp2. If it is determined that a result of the step S410 is yes, the switching converter 2000 enters the step S300 (i.e., switching conversion mode) or otherwise the switching converter 2000 returns to the step S410.

It is worthwhile noting that, in one embodiment, the switching converter 2000 enters the pre-charging conversion mode only at the beginning. Subsequent to the step S200, the switching converter 2000 will only operate in the switching conversion mode or the linear conversion mode.

Figures 4, 5:
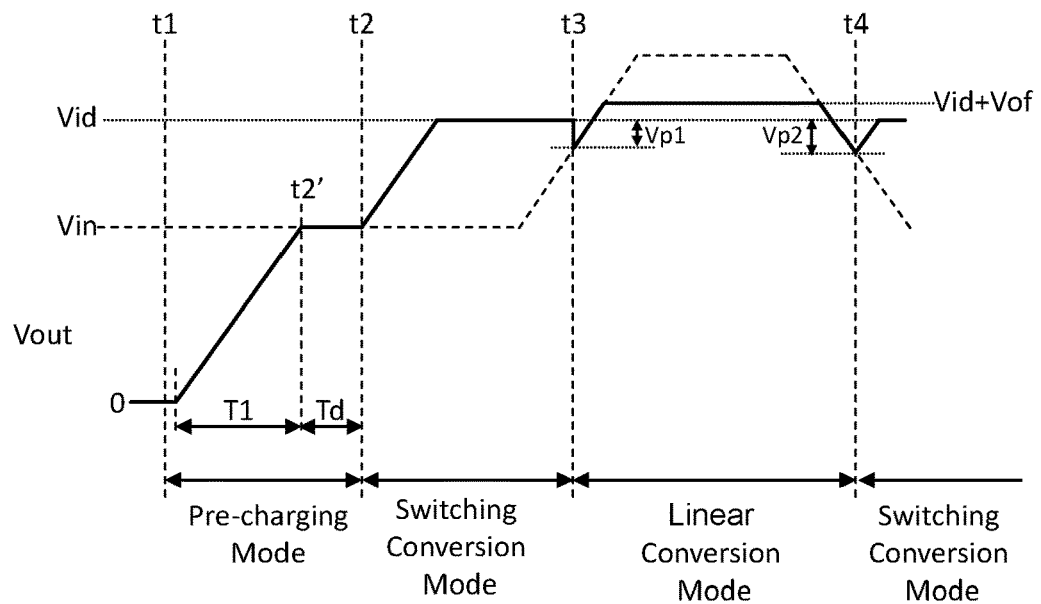
FIG. 4 illustrates a signal waveform diagram depicting an output voltage of a switching converter according to an embodiment of the present invention.
FIG. 5 is a state table of a high-side switch, a low-side switch and an auxiliary transistor when the switching converter is operated in three different modes according to an embodiment of the present invention.

Please refer to FIG. 2 along with FIG. 4 and FIG. 5. FIG. 4 illustrates a signal waveform diagram depicting an output voltage of a switching converter of FIG. 2 according to an embodiment of the present invention. FIG. 5 is a state table showing respective different states of a high-side switch, a low-side switch and an auxiliary transistor when a switching converter is in three different corresponding modes according to an embodiment of the present invention. In one embodiment, as shown in FIG. 4, in one embodiment, the switching converter 2000 begins to operate at a time point t1 and enters a pre-charging conversion mode. In one embodiment, in the pre-charging conversion mode (i.e., a period ranging from the time point t1 to a time point t2), the switching control circuit 210 is configured to operably control the low-side switch QL to be OFF and control the high-side switch QH to be ON or OFF. Besides, the pre-charging control circuit 220 is configured to operably control the auxiliary transistor QA to be gradually ON, to pre-charge the output voltage Vout, so that during a predetermined interval T1, the output voltage Vout is ramped up to a level close to the input voltage Vin with a predetermined waveform (e.g., with a linear slope). It is worthwhile noting that, in the embodiment where the high-side switch QH is controlled to be ON, a pre-charging current can be supplied from the input voltage Vin through the body diode of the high-side switch QH.

At a time point t2' shown in FIG. 4, when the determination step S210 determines that the level of the output voltage Vout is close to the level of the input voltage Vin, after a delay period TD, the switching converter 2000 will enter the switching conversion mode at the time point t2. In one embodiment, in the switching conversion mode (i.e., a period ranging from the time point t2 to a time point t3), the auxiliary transistor QA is controlled to be ON. The switching control circuit 210 is configured to operably control switching of the high-side switch QH and the low-side switch QL according to a duty ratio, so as to regulate the output voltage Vout substantially to the target voltage level Vid. In one embodiment, at the time point 3 shown in FIG. 4, because the determination step S310 determines that the difference between the target voltage level Vid and the level of the input voltage Vin is smaller than the first predetermined level Vp2, the switching converter 2000 accordingly enters the linear conversion mode. In one embodiment, in the linear conversion mode (i.e., a period ranging from the time point t3 to a time point t4), the switching control circuit 210 is configured to operably control the high-side switch QH to be ON and control the low-side switch QL to be OFF. Besides, in the linear conversion mode, the linear control circuit 230 is configured to operably control the auxiliary transistor QA, so as to regulate the output voltage Vout substantially to the target voltage level Vid. In this embodiment, the linear control circuit 230 is configured to operably control the auxiliary transistor QA, so as to regulate the output voltage Vout substantially equal to a sum of the target voltage level Vid plus an offset voltage level Vof. In one embodiment, the offset voltage level Vof is greater than or equal to zero. In this embodiment, the offset voltage level Vof is greater than zero, such that when a load is in a heavy load condition, the output voltage Vout will not become overly low. In one embodiment, at the time point 4 shown in FIG. 4, because the determination step S410 determines that the difference between the target voltage level Vid and the level of the input voltage Vin is greater than the second predetermined level Vp2, the switching converter 2000 accordingly enters the switching conversion mode. In one embodiment, the second predetermined level Vp2 is greater than the first predetermined level Vp1 for providing a hysteresis, such that the mode transition between the switching conversion mode and the linear conversion mode is more stable.

It is worthwhile noting that, generally, in the aforementioned embodiment where the power stage circuit 100 is implemented as a boost converter, the target voltage level Vid is higher than the level of the input voltage Vin. To overcome this limitation, the present invention further employs a linear conversion mode, when the level of the input voltage Vin is close to or higher than the target voltage level Vid, to linearly regulate the output voltage Vout substantially to the target voltage level Vid through controlling the auxiliary transistor QA via the linear control circuit 230.

In the aforementioned embodiment shown in FIG. 4, within a period ranging from the time point t1 to the time point t4, the target voltage level Vid remains unchanged, whereas, the level of the input voltage Vin changes as time changes. It is worthwhile noting that it should be understood that this arrangement is only an illustrative example, but not for limiting the broadest scope of the present invention. No matter how the target voltage level Vid and/or the level of the input voltage Vin changes, as long as the difference between the target voltage level Vid and the level of the input voltage Vin is sufficiently low, the switching converter 2000 of the present invention will enter the linear conversion mode, so as to linearly regulate the output voltage Vout substantially to the target voltage level Vid plus an offset voltage level Vof. As described above in the section "Description of Related Art" of this application, a drawback for the prior art switching converter 900 is that: when the level of the input voltage Vin is higher than the target voltage level V1, the output voltage cannot be regulated to be substantially equal to the target voltage level V1 due to the nature of the boost converter (i.e., the conventional power stage circuit 90). Compared to the prior art switching converter 900, the switching converter 2000 of the present invention is not limited by the nature of the boost converter. When the level of the input voltage Vin is higher than the target voltage level Vid, the switching converter 2000 of the present invention is still capable of regulating the output voltage Vout substantially equal to the target voltage level Vid plus an offset voltage level Vof.

Figure 6:
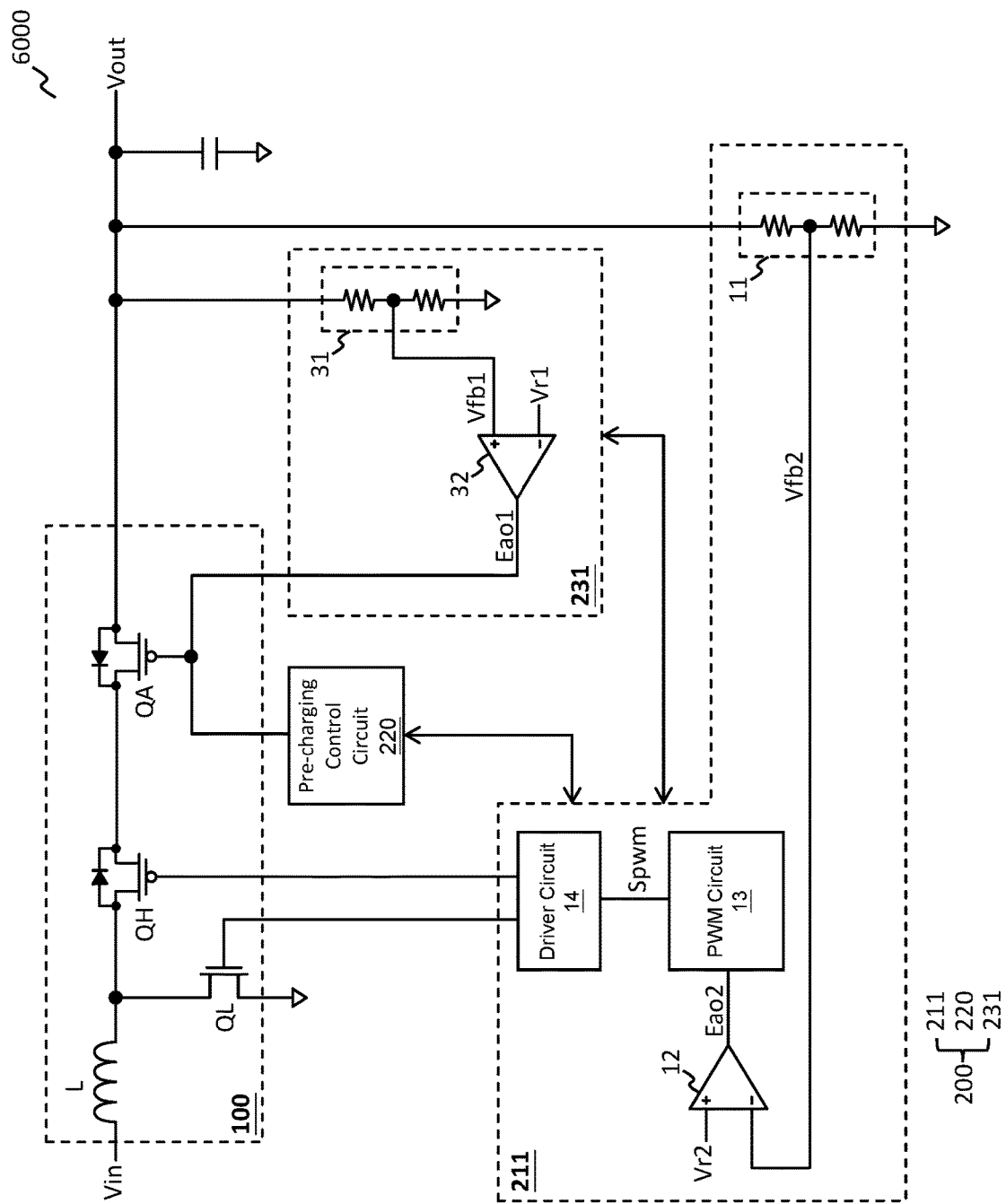
FIG. 6 shows a schematic diagram of a switching converter according to an embodiment of the present invention.

Please refer to FIG. 6, which shows a schematic diagram of a switching converter according to an embodiment of the present invention. In one embodiment, in the switching converter 6000 shown in FIG. 6, a conversion control circuit 200 includes: a switching control circuit 211, a pre-charging control circuit 220 and a linear control circuit 231. In one embodiment, the linear control circuit 231 includes: a first feedback circuit 31 and an error amplifier 32. The switching control circuit 211 includes: a second feedback circuit 11, an error amplifier 12, a pulse width modulation (PWM) circuit 13 and a driver circuit 14.

In one embodiment, in a switching conversion mode, an auxiliary transistor QA is controlled to be ON. The second feedback circuit 11 is configured to operably generate the second feedback signal Vfb2 according to an output voltage Vout. The error amplifier 12 is configured to operably amplify a difference between the second feedback signal Vfb2 and a second reference signal Vr2 to generate an error amplification signal Eao2. PWM circuit 13 is configured to operably generate a PWM signal Spwm in accordance with the error amplification signal Eao2. The driver circuit 14 is configured to operably generate driving signals for controlling switching of the high-side switch QH and the low-side switch QL according to the PWM signal Spwm, so as to convert the input voltage Vin to the output voltage Vout with boost conversion.

In one embodiment, in a linear conversion mode, the low-side switch QL is controlled to be OFF and the high-side switch QH is controlled to be ON. The first feedback circuit 31 is configured to operably generate the first feedback signal Vfb1 according to the output voltage Vout. The error amplifier 32 is configured to operably amplify a difference between the first feedback signal Vfb1 and a first reference signal Vr1 to generate an error amplification signal Eao1. In one embodiment, in the linear conversion mode, the auxiliary transistor QA is configured to operably convert the input voltage Vin to the output voltage Vout linearly according to the error amplification signal Eao1.

Figure 7:
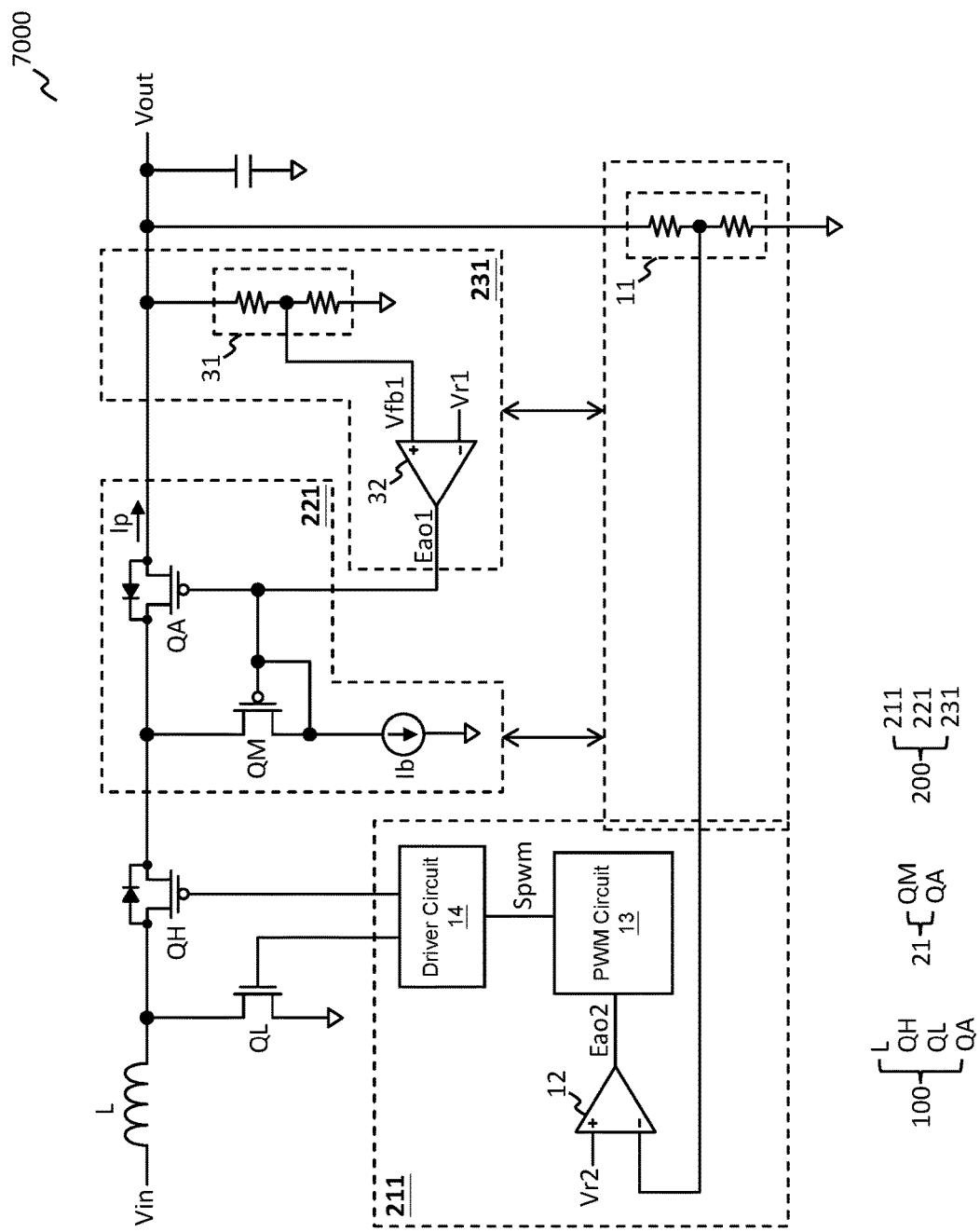
FIG. 7 shows a schematic diagram of a switching converter according to a specific embodiment of the present invention.

Please refer to FIG. 7, which shows a schematic diagram of a switching converter according to a specific embodiment of the present invention. The switching converter 7000 of this embodiment shown in FIG. 7 is similar to the switching converter 6000 of the embodiment shown in FIG. 6, but is different in that: as compared to the embodiment shown in FIG. 6, in one specific embodiment, a pre-charging control circuit 221 in FIG. 7 includes: a current mirror circuit 21 and a bias current source Ib. In one embodiment, the current mirror circuit 21 has an auxiliary transistor QA and a transistor QM. In this embodiment, each of the auxiliary transistor QA and the transistor QM is a P-type MOS device. In one embodiment, in a pre-charging conversion mode, the current mirror circuit 21 is configured to operably mirror a bias current source Ib, so as to control the auxiliary transistor QA to generate a pre-charging current Ip for pre-charging the output voltage Vout, wherein the pre-charging current Ip is positively proportional to the bias current source Ib.

Figure 8:
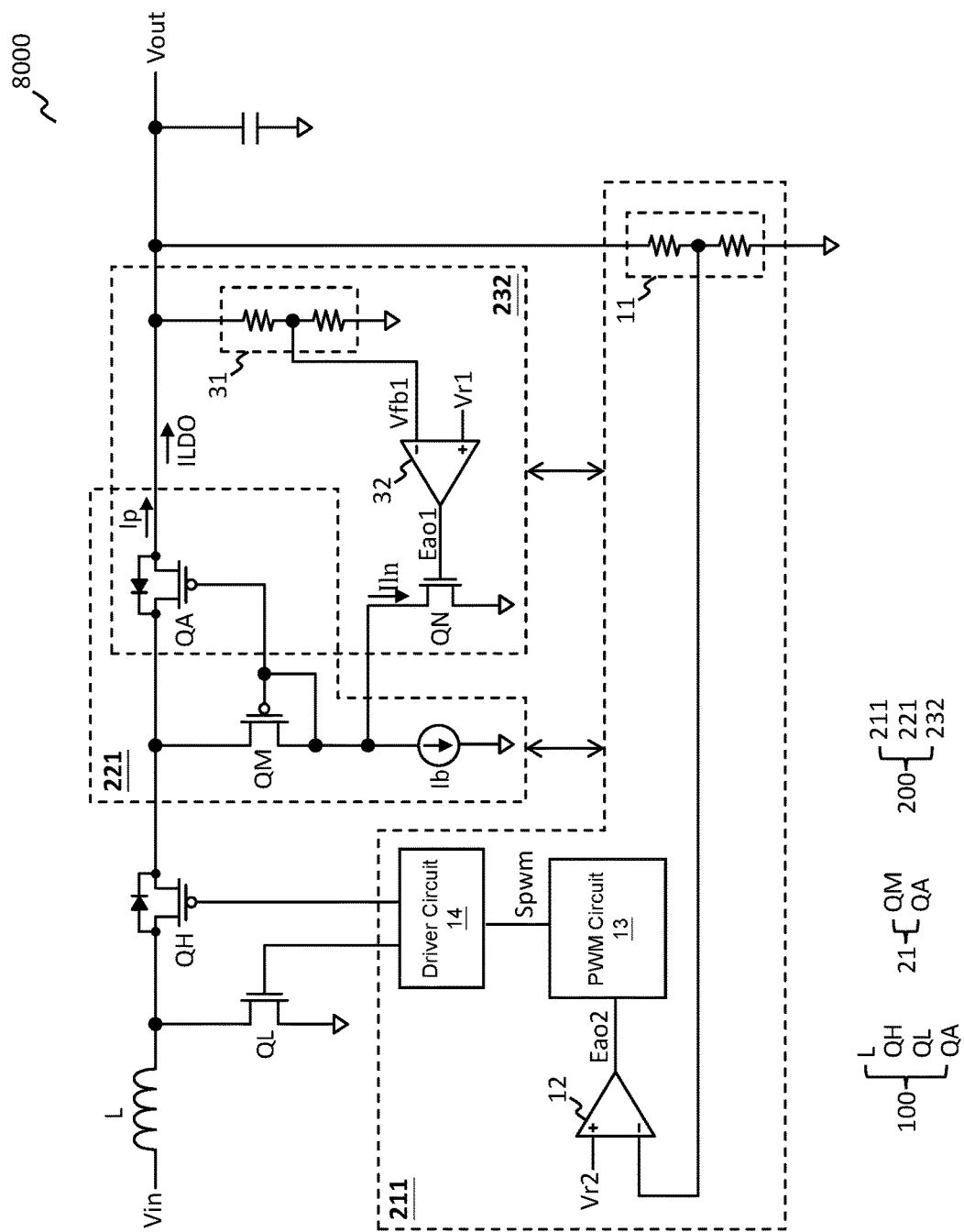
FIG. 8 shows a schematic diagram of a switching converter according to a specific embodiment of the present invention.

Please refer to FIG. 8, which shows a schematic diagram of a switching converter according to a specific embodiment of the present invention. The switching converter 8000 of this embodiment shown in FIG. 8 is similar to the switching converter 7000 of the embodiment shown in FIG. 7, but is different in that: as compared to the embodiment shown in FIG. 7, the linear control circuit 232 in FIG. 8 further includes: a transconductance transistor QN and an auxiliary transistor QA. In the embodiment shown in FIG. 8, in a linear conversion mode, the transconductance transistor QN is configured to operably generate a linear control current Iln according to the error amplification signal Eao1. In this embodiment, in the linear conversion mode, the current mirror circuit 21 is further configured to operably mirror the linear control current Iln, so as to generate a linear output current ILDO configured to control the auxiliary transistor QA to linearly convert the input voltage Vin to the output voltage Vout. In this embodiment, the auxiliary transistor QA is a common component included by the power stage circuit 100, the pre-charging control circuit 221 and the linear control circuit 232.

It is worthwhile noting that, in the switching converter of the present invention, the auxiliary transistor QA is configured not only to pre-charge the output voltage Vout, but also operated as a linear control transistor when the level of the input voltage Vin is greater than the target voltage level Vid. When operated as the linear control transistor, the auxiliary transistor QA is controlled to linearly convert the input voltage Vin to the output voltage Vout. In other words, in a premise where the manufacturing cost is not increased and the circuit size is not enlarged, by sharing the auxiliary transistor QA of the pre-charging control circuit to alternatively, the present invention not only is capable of performing pre-charging in a pre-charging mode, but also is capable of linearly regulating the output voltage Vout substantially to the target voltage level Vid plus an offset voltage level Vof in a linear conversion mode when the level of the input voltage Vin is close to or higher than the target voltage level Vid.

Figure 9:
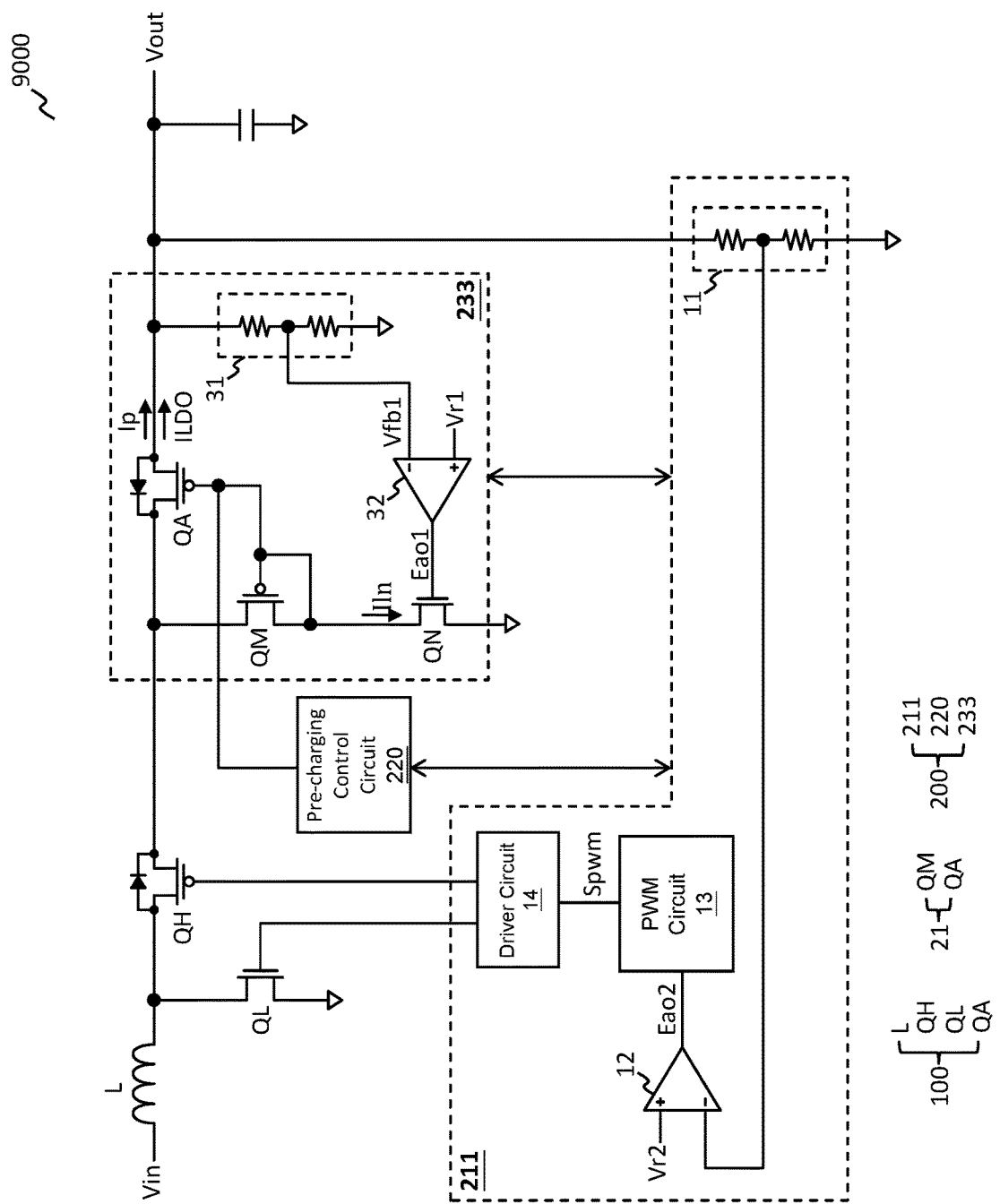
FIG. 9 shows a schematic diagram of a switching converter according to an embodiment of the present invention.

Please refer to FIG. 9, which shows a schematic diagram of a switching converter according to an embodiment of the present invention. The switching converter 9000 of this embodiment shown in FIG. 9 is similar to the switching converter 6000 of the embodiment shown in FIG. 6, but is different in that: as compared to the embodiment shown in FIG. 6, a linear control circuit 233 in FIG. 9 further includes: a transconductance transistor QN and a current mirror circuit 21, wherein the current mirror circuit 21 includes an auxiliary transistor QA and a transistor QM. In one embodiment, in a linear conversion mode, the transconductance transistor QN is configured to operably generate a linear control current Iln according to an error amplification signal Eao1. In this embodiment, the current mirror circuit 21 is configured to operably mirror the linear control current Iln, so as to control the auxiliary transistor QA to linearly convert the input voltage Vin to the output voltage Vout. In this embodiment, the actual implementation of the pre-charging control circuit 220 for controlling the auxiliary transistor QA to pre-charge is not limited.

Figure 10:
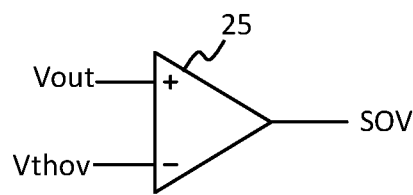
FIG. 10 shows a schematic diagram of a portion of a conversion control circuit in a switching converter according to an embodiment of the present invention.
Figure 10:
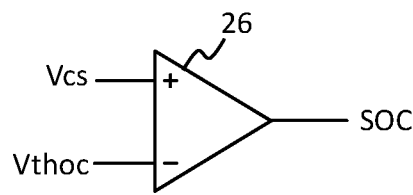
Figure 10:
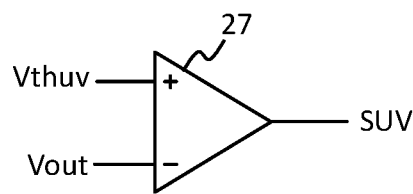

Please refer to FIG. 10, which shows a schematic diagram of a portion of a conversion control circuit in a switching converter according to an embodiment of the present invention. The conversion control circuit 200 of FIG. 2 further includes: a comparator 25, a comparator 26 and a comparator 27 (as shown in FIG. 10). The comparator 25 is configured to compare an output voltage Vout with an overly-high voltage threshold Vthov, so as to generate an overly-high voltage indication signal SOV. The comparator 26 is configured to compare a current sensing signal Vcs with the overly-high current threshold Vthoc, so as to generate an overly-high current indication signal SOC. The comparator 27 is configured to compare the output voltage Vout with an overly-low voltage threshold Vthuv, so as to generate an overly-low voltage indication signal SUV. In one embodiment, the aforementioned current sensing signal Vcs is correlated with a pre-charging current Ip, an inductor current flowing through an inductor L and a linear output current ILDO respectively corresponding to the pre-charging conversion mode, the switching conversion mode and the linear conversion mode.

Figure 11:
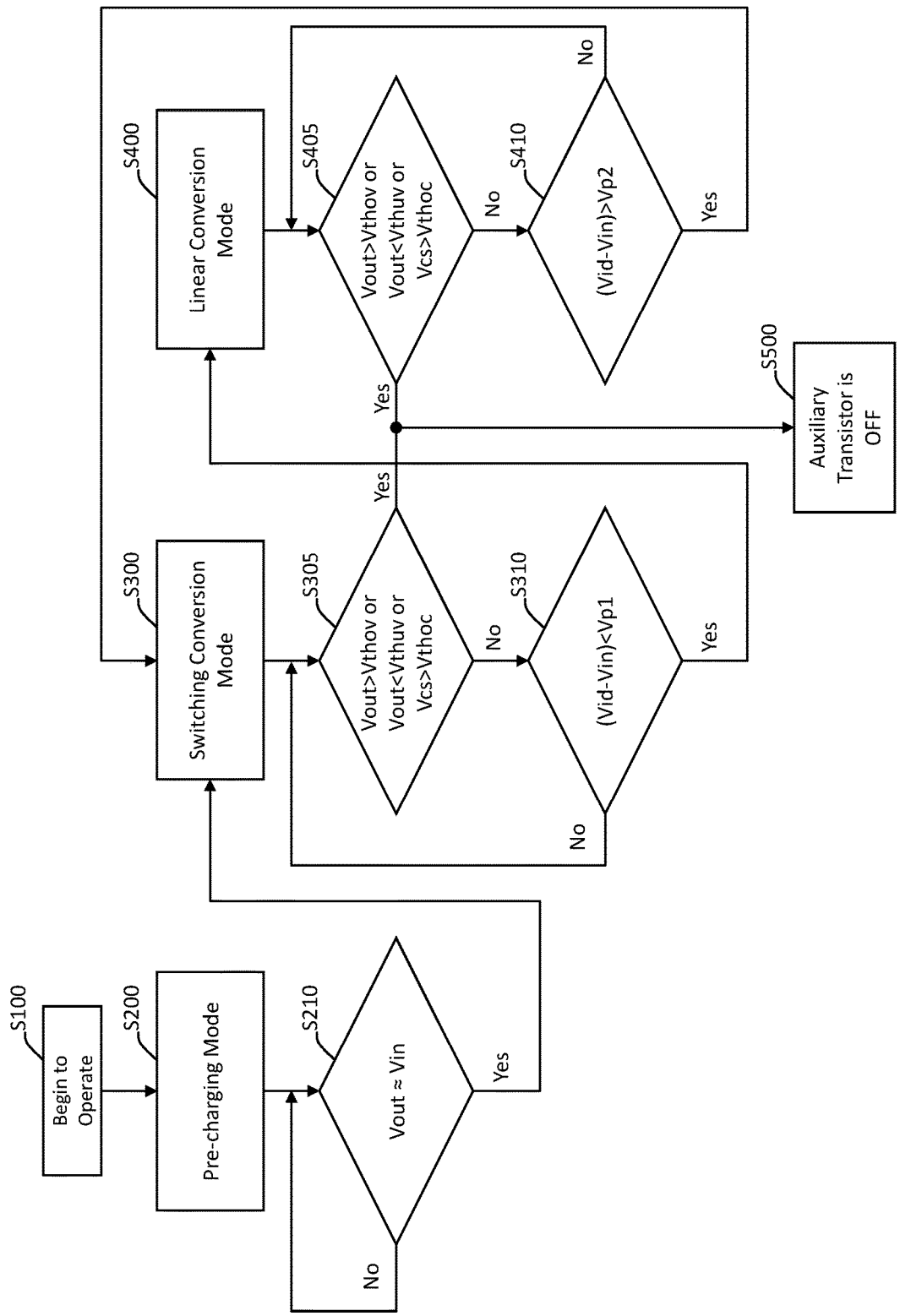
FIG. 11 is a flow chart diagram depicting operation procedures for a switching converter according to an embodiment of the present invention.

Please refer to FIG. 10 along with FIG. 11. FIG. 11 is a flow chart diagram depicting operation procedures for a switching converter according to an embodiment of the present invention. The operation procedures of this embodiment shown in FIG. 10 is similar to the operation procedures of the embodiment shown in FIG. 3, but is different in that: as compared to the embodiment shown in FIG. 3, in one embodiment, subsequent to the termination of a step S300 of FIG. 11, the switching converter 2000 further enters a determination step S305 which includes: determining whether the output voltage Vout is higher than the overly-high voltage threshold Vthov by the comparator 25, determining whether the output voltage Vout is lower than the overly-low voltage threshold Vthuv by the comparator 27 and/or determining whether the current sensing signal Vcs (related the output current of the output voltage Vout) is higher than the overly-high current threshold Vthoc by the comparator 26. In one embodiment, the determination step S305 is configured to determine whether the overly-high voltage indication signal SOV, the overly-high current indication signal SOC or the overly-low voltage indication signal SUV is at a high level. If it is determined that a result of the step S305 is yes, the switching converter 2000 enters a step S500 which includes: the conversion control circuit 200 controls the auxiliary transistor QA to be OFF, so that the high-side switch QH and the low-side switch QL are both OFF, thereby accomplishing over voltage protection, over current protection and under voltage protection. In one embodiment, if it is determined that a result of the step S305 is no, the switching converter 2000 enters a determination step S310. In regard to the details of the determination step S310, please refer to descriptions regarding the embodiment shown in FIG. 3. In one embodiment, subsequent to the termination of a step S400 of FIG. 11, the switching converter 2000 further enters a determination step S405. The determination step S405 operates in the same way as determination step S305, so the details thereof are not redundantly repeated here.

Please refer to FIG. 12A to FIG. 12D, which show schematic diagrams of a power stage circuit in a switching converter according to several embodiments of the present invention. The power stage circuit of the present invention includes: at least one switch and an inductor which are coupled to each other, wherein the at least one switch is configured to switch the inductor according to a control signal, to convert an input power to an output power. As shown in FIG. 12A to FIG. 12D, the power stage circuit of the present invention includes, for example but not limited to, a boost converter or a buck-boost converter.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a portion of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A switching converter capable of performing linear conversion, wherein the switching converter is configured to operably convert an input voltage to an output voltage; the switching converter comprising:
 a power stage circuit which includes: a high-side switch, a low-side switch and an auxiliary transistor, wherein one end of the high-side switch, one end of the low-side switch and one end of an inductor are coupled to a switching node, wherein another end of the high-side switch and one end of the auxiliary transistor are coupled to an intermediate node, wherein another end of the auxiliary transistor is coupled to the output voltage; and
 a conversion control circuit, which is configured to operably control the high-side switch, the low-side switch and the auxiliary transistor;
 wherein in a switching conversion mode, the conversion control circuit is configured to operably control the auxiliary transistor to be ON and control the high-side switch and the low-side switch to switch the inductor, so as to convert the input voltage to the output voltage;
 wherein in a pre-charging conversion mode, the conversion control circuit is configured to operably control the low-side switch to be OFF and control the auxiliary transistor to pre-charge the output voltage;
 wherein in a linear conversion mode, the conversion control circuit is configured to operably control the low-side switch to be OFF and control the auxiliary transistor to linearly convert the input voltage to the output voltage according to a first feedback signal related to the output voltage.

2. The switching converter of claim 1, wherein in the pre-charging conversion mode, the conversion control circuit is configured to operably control the high-side switch to be OFF; and/or
 wherein in the linear conversion mode, the conversion control circuit is configured to operably control the high-side switch to be ON.

3. The switching converter of claim 1, wherein in the switching conversion mode, the conversion control circuit is configured to operably control switching of the high-side switch and the low-side switch, so as to regulate the output voltage to a target voltage level, wherein when a difference between the target voltage level and the input voltage is smaller than a first predetermined level, the switching converter enters the linear conversion mode.

4. The switching converter of claim 3, wherein in the linear conversion mode, the conversion control circuit is configured to operably control the auxiliary transistor, so as to regulate the output voltage to the target voltage level, wherein when the difference between the target voltage level and the input voltage is greater than a second predetermined level, the switching converter enters the switching conversion mode.

5. The switching converter of claim 1, wherein in the pre-charging conversion mode, when the output voltage is being pre-charged close to the input voltage, the switching converter enters the switching conversion mode.

6. The switching converter of claim 1, wherein an anode and a cathode of a body diode of the high-side switch are coupled to the switching node and the intermediate node respectively, and an anode and a cathode of a body diode of the auxiliary switch are coupled to the output voltage and the intermediate node, respectively.

7. The switching converter of claim 1, wherein the conversion control circuit includes:
 a first feedback circuit, which is configured to operably generate the first feedback signal according to the output voltage; and
 an error amplifier, which is configured to operably amplify a difference between the first feedback signal and a first reference signal to generate an error amplification signal;
 wherein in the linear conversion mode, the auxiliary transistor is configured to operably convert the input voltage to the output voltage linearly according to the error amplification signal.

8. The switching converter of claim 7, wherein the conversion control circuit further includes: a current mirror circuit, wherein the current mirror circuit includes the auxiliary transistor;
 wherein in the pre-charging conversion mode, the current mirror circuit is configured to operably mirror a bias current source, so as to control the auxiliary transistor to generate a pre-charging current for pre-charging the output voltage;

wherein the pre-charging current is positively proportional to the bias current source.

9. The switching converter of claim 8, wherein the conversion control circuit further includes: a transconductance transistor;

wherein in the linear conversion mode, the transconductance transistor is configured to operably generate a linear control current according to the error amplification signal, wherein the current mirror circuit is further configured to operably mirror the linear control current, so as to control the auxiliary transistor to linearly convert the input voltage to the output voltage.

10. The switching converter of claim 7, wherein the conversion control circuit further includes: a transconductance transistor and a current mirror circuit, wherein the current mirror circuit includes the auxiliary transistor;

wherein in the linear conversion mode, the transconductance transistor is configured to operably generate a linear control current according to the error amplification signal, wherein the current mirror circuit is configured to operably mirror the linear control current, so as to control the auxiliary transistor to linearly convert the input voltage to the output voltage.

11. The switching converter of claim 1, wherein when the output voltage is higher than an overly-high voltage threshold and lower than an overly-low voltage threshold and/or when an output current related to the output voltage is higher than an overly-high current threshold, the conversion control circuit is configured to operably control the auxiliary transistor to be OFF.

12. A conversion control circuit, which is configured to operably control a switching converter, wherein the switching converter is configured to operably convert an input voltage to an output voltage, wherein the switching converter includes: a high-side switch, a low-side switch and an auxiliary transistor, wherein one end of the high-side switch, one end of the low-side switch and one end of an inductor are coupled to a switching node, wherein another end of the high-side switch and one end of the auxiliary transistor are coupled to an intermediate node, wherein another end of the auxiliary transistor is coupled to the output voltage; the conversion control circuit comprising:

a switching control circuit, which is configured to operably control the high-side switch and the low-side switch to switch the inductor, so as to convert the input voltage to the output voltage in a switching conversion mode, wherein in the switching conversion mode, the auxiliary transistor is ON;

a pre-charging control circuit, which is configured to operably control the auxiliary transistor to pre-charge the output voltage in a pre-charging conversion mode, wherein in the pre-charging conversion mode, the low-side switch is OFF;

a linear control circuit, which is configured to operably control the auxiliary transistor to linearly convert the input voltage to the output voltage according to a first feedback signal related to the output voltage in a linear conversion mode, wherein in the linear conversion mode, the low-side switch is OFF.

13. The conversion control circuit of claim 12, wherein in the pre-charging conversion mode, the conversion control circuit is configured to operably control the high-side switch to be OFF; and/or wherein in the linear conversion mode, the conversion control circuit is configured to operably control the high-side switch to be ON.

14. The conversion control circuit of claim 12, wherein in the switching conversion mode, the conversion control circuit is configured to operably control switching of the high-side switch and the low-side switch, so as to regulate the output voltage to a target voltage level, wherein when a difference between the target voltage level and the input voltage is smaller than a first predetermined level, the switching converter enters the linear conversion mode.

15. The conversion control circuit of claim 14, wherein in the linear conversion mode, the conversion control circuit is configured to operably control the auxiliary transistor, so as to regulate the output voltage to the target voltage level, wherein when the difference between the target voltage level and the input voltage is greater than a second predetermined level, the switching converter enters the switching conversion mode.

16. The conversion control circuit of claim 12, wherein in the pre-charging conversion mode, when the output voltage is being pre-charged close to the input voltage, the switching converter enters the switching conversion mode.

17. The conversion control circuit of claim 12, wherein an anode and a cathode of a body diode of the high-side switch are coupled to the switching node and the intermediate node respectively, and an anode and a cathode of a body diode of the auxiliary switch are coupled to the output voltage and the intermediate node, respectively.

18. The conversion control circuit of claim 12, wherein the linear control circuit includes:

a first feedback circuit, which is configured to operably generate the first feedback signal according to the output voltage; and an error amplifier, which is configured to operably amplify a difference between the first feedback signal and a first reference signal to generate an error amplification signal;

wherein in the linear conversion mode, the auxiliary transistor is configured to operably convert the input voltage to the output voltage linearly according to the error amplification signal.

19. The conversion control circuit of claim 18, wherein the pre-charging control circuit further includes: a current mirror circuit, wherein the current mirror circuit includes the auxiliary transistor;

wherein in the pre-charging conversion mode, the current mirror circuit is configured to operably mirror a bias current source, so as to control the auxiliary transistor to generate a pre-charging current for pre-charging the output voltage;

wherein the pre-charging current is positively proportional to the bias current source.

20. The conversion control circuit of claim 19, wherein the linear control circuit further includes: a transconductance transistor;

wherein in the linear conversion mode, the transconductance transistor is configured to operably generate a linear control current according to the error amplification signal, wherein the current mirror circuit is further configured to operably mirror the linear control current, so as to control the auxiliary transistor to linearly convert the input voltage to the output voltage.

21. The conversion control circuit of claim 18, wherein the linear control circuit further includes: a transconductance transistor and a current mirror circuit, wherein the current mirror circuit includes the auxiliary transistor;

wherein in the linear conversion mode, the transconductance transistor is configured to operably generate a linear control current according to the error amplification signal, wherein the current mirror circuit is configured to operably mirror the linear control current, so as to control the auxiliary transistor to linearly convert the input voltage to the output voltage.

22. A conversion control method, which is configured to operably control a switching converter, wherein the switching converter includes: a high-side switch, a low-side switch and an auxiliary transistor; the conversion control method comprising the following steps:
in a switching conversion mode, controlling the auxiliary transistor to be ON and controlling the high-side switch and the low-side switch to switch the inductor, so as to convert the input voltage to the output voltage;
in a pre-charging conversion mode, controlling the low-side switch to be OFF and controlling the auxiliary transistor to pre-charge the output voltage;
in a linear conversion mode, controlling the low-side switch to be OFF and controlling the auxiliary transistor to linearly convert the input voltage to the output voltage according to a first feedback signal related to the output voltage.

23. The conversion control method of claim 22, wherein in the pre-charging conversion mode, the high-side switch is further controlled to be OFF; and/or
wherein in the linear conversion mode, the high-side switch is further controlled to be ON.

24. The conversion control method of claim 22, wherein in the switching conversion mode, the conversion control method further controls switching of the high-side switch and the low-side switch, so as to regulate the output voltage to a target voltage level, wherein when a difference between the target voltage level and the input voltage is smaller than a first predetermined level, the switching converter is controlled to enter the linear conversion mode.

25. The conversion control method of claim 24, wherein in the linear conversion mode, the conversion control method further controls the auxiliary transistor to regulate the output voltage to the target voltage level, wherein when the difference between the target voltage level and the input voltage is greater than a second predetermined level, the switching converter is controlled to enter the switching conversion mode.

26. The conversion control method of claim 22, wherein in the pre-charging conversion mode, when the output voltage is being pre-charged close to the input voltage, the switching converter is controlled to enter the switching conversion mode.

27. The conversion control method of claim 22, further comprising the following steps:
generating the first feedback signal according to the output voltage; and
amplifying a difference between the first feedback signal and a first reference signal to generate an error amplification signal; and
in the linear conversion mode, controlling the auxiliary transistor to linearly convert the input voltage to the output voltage according to the error amplification signal.

28. The conversion control method of claim 27, further comprising the following steps:
in the pre-charging conversion mode, mirroring a bias current source, so as to control the auxiliary transistor to generate a pre-charging current for pre-charging the output voltage;
wherein the pre-charging current is positively proportional to the bias current source.

29. The conversion control method of claim 28, further comprising the following steps:
in the linear conversion mode, generating a linear control current according to the error amplification signal; and
mirroring the linear control current, so as to control the auxiliary transistor to linearly convert the input voltage to the output voltage.

30. The conversion control method of claim 22, wherein when the output voltage is higher than an overly-high voltage threshold and lower than an overly-low voltage threshold and/or when an output current related to the output voltage is higher than an overly-high current threshold, the auxiliary transistor is further controlled to be OFF.

* * * * *